US012781779B2

(12) United States Patent
Giertulla et al.

(10) Patent No.: US 12,781,779 B2
(45) Date of Patent: Nov. 3, 2026

(54) FASTENING SYSTEM FOR MOUNTING PLATE-SHAPED ELEMENTS

(71) Applicant: RANIT-Befestigungssysteme GmbH, Herten (DE)

(72) Inventors: Roger Giertulla, Herne (DE); Bernd Gräwe, Herten (DE)

(73) Assignee: RANIT-BEFESTIGUNGSSYSTEME GMBH, Herten (DE)

( * ) Notice: Subject to any disclaimer, the term of this patent is extended or adjusted under 35 U.S.C. 154(b) by 505 days.

(21) Appl. No.: 18/370,503

(22) Filed: Sep. 20, 2023

(65) Prior Publication Data

US 2025/0092894 A1 Mar. 20, 2025

(51) Int. Cl.

*F16B 5/01* (2006.01)
*E04B 1/38* (2006.01)
*F16B 13/14* (2006.01)

(52) U.S. Cl.

CPC ................ *F16B 5/01* (2013.01); *E04B 1/388* (2023.08); *F16B 13/141* (2013.01)

(58) Field of Classification Search

CPC .......... F16B 13/141; F16B 12/20; F16B 5/01; E04B 1/388; E04B 1/38

See application file for complete search history.

(56) References Cited

FOREIGN PATENT DOCUMENTS

| | | | |
|---|---|---|---|
| DE | 202005006303 | U1 | 6/2005 |
| DE | 19924205 | B4 | 8/2011 |
| EP | 3138974 | A1 | 3/2017 |
| KR | 20190008594 | A | 1/2019 |
| RU | 2584425 | C1 | 5/2016 |
| WO | 2007099739 | A1 | 9/2007 |

OTHER PUBLICATIONS

English translation of EP 2071197. (Year: 2009).*
English translation of EP 3421678. (Year: 2019).*
English translation of EP 4102085. (Year: 2022).*
European Search Report Dated Oct. 27, 2021, 2 Pages.

* cited by examiner

*Primary Examiner* — Zakiya W Bates

(74) *Attorney, Agent, or Firm* — LUCAS & MERCANTI, LLP

(57) ABSTRACT

A fastening system for mounting plate-shaped elements on a surface of a support includes a fastener designed to anchor the fastening system in the support, at least two sleeves arranged behind the fastener in an anchoring direction, and a releasable connection connecting each adjacent pair of sleeves of the at least two sleeves, each of the at least two sleeves having wall openings. The fastener is configured to be guided through the at least two sleeves. A front sleeve of the at least two sleeves in the anchoring direction receives the fastener.

15 Claims, 9 Drawing Sheets

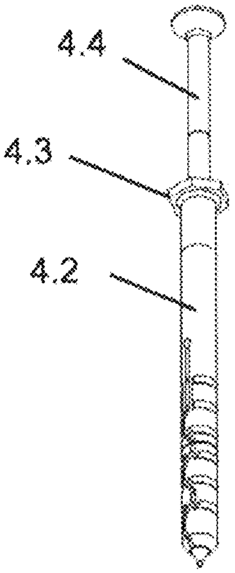
Figure 3a
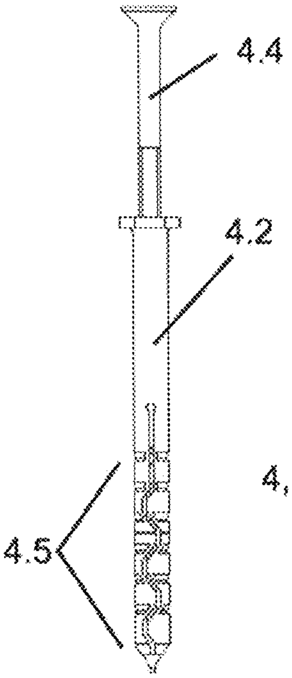
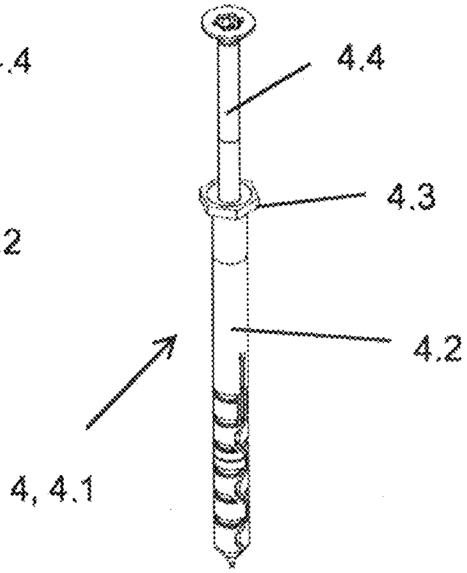
Figure 3c
Figure 3b

FASTENING SYSTEM FOR MOUNTING PLATE-SHAPED ELEMENTS

BACKGROUND OF THE INVENTION

The invention relates to a fastening system for mounting plate-shaped elements on a surface of a support.

Methods for mounting plate-shaped elements, in particular insulating boards, on a surface of a support as well as fastening systems for this are known from the prior art. A sleeve with a fastener that can be guided through the sleeve is sunk into the plate-shaped element through a hole pre-drilled into the plate-shaped element and anchored in the support by the fastener. The sleeve, also referred to as a perforated sleeve, has a plurality of wall openings in order to enable adhesive inserted into the inside of the sleeve to pass through.

The fastener is a screw, for example, or if the support requires it, a combination of anchor and screw. In addition to facade walls, the term "support" also includes any kind of substructure on which the plate-shaped elements, in particular lightweight components such as foam bodies and heat-insulating or sound-insulating materials in the form of panels, boards, strips, etc., are mounted. Such fastening systems are used in particular to mount plaster-based thermal insulation composite systems for insulation. This usually involves sticking an insulating layer, for example of polystyrene boards or high density rockwool boards, onto the masonry, then anchoring it in place and subsequently plastering it.

A fastening system is known from EP 3 138 974 A1. The perforated sleeves are usually cylindrical and have an outer diameter, which corresponds substantially to the diameter of a hole within the insulating board. Adhesive is inserted into the inside of the sleeve and passes through the openings inside the sleeve to the outside, where it hardens and forms a firm bond between the plate-shaped element and the fastening system.

In practice, however, it has been shown that the adhesive passing through the openings is not always able to displace the adjacent material of the plate-shaped element to such an extent that sufficient amounts of adhesive can pass through the openings of the sleeve.

In order to improve the bond with the plate-shaped element, EP 3 421 678 A1 proposes a perforated sleeve, which has an outer diameter at least over a partial length that is smaller than the hole previously drilled into the plate-shaped element. The perforated sleeve has a plurality of wall openings, wherein the sleeve has at least two spacers, which are distributed over its circumference and project beyond the outer diameter of the base body of the sleeve and are thus provided protruding radially outwards on the sleeve base body. This centres the sleeve of the fastening system within the pre-drilled hole in the plate-shaped element. After the sleeve has been inserted into the plate-shaped element and the fastener has been anchored in the support, the curable adhesive is inserted into the sleeve, passes through the plurality of wall openings and, as a result of the gap formed between the perforated sleeve and the plate-shaped element, it forms an all-over connection with the outside of the hole. This ensures that the adhesive surrounds the sleeve and embeds the sleeve within the hole in the plate-shaped element. An adhesive foam is particularly suitable as an adhesive, preferably an adhesive foam that is classified as a fire protection foam of Class B1 according to DIV 4120-1. A PU foam is preferably used due to a relatively low expansion and high adhesive strength after setting.

The known fastening system can not only be used to mount insulating boards directly on a surface of the support, but can also be used to renovate existing insulating facades. New, additional insulating boards are stuck onto the insulating facade already mounted on the surface of the support and are then anchored into place. The known fastening system has to be designed such that the sleeve is long enough to connect both insulating boards, both the old and the new one, to one another. This means that the old insulation does not have to be removed; rather, a new insulating board is additionally stuck onto the old one and anchored in place, which is known among experts as so-called "sistering". Depending on the thickness and number of layers of the insulating boards to be mounted, sleeves having various lengths must be produced and provided on the construction site. Producing non-identical sleeves is time-consuming and costly. The provision of sleeves having different lengths on the construction site also increases the logistical complexity.

BRIEF SUMMARY OF THE INVENTION

Based on this prior art, the object of the invention is to provide a fastening system with which plate-shaped elements, in particular insulating boards, of varying thicknesses and/or number of layers can be easily anchored to a surface of a support.

According to the invention, this object is achieved by a fastening system for mounting plate-shaped elements on a surface of a support, which fastening system includes a fastener designed to anchor the fastening system in the surface of the support, at least two sleeves arranged in an anchoring direction behind the fastener and having wall openings, wherein the fastener can be guided through the sleeves and a front sleeve of the at least two sleeves in the anchoring direction receives the fastener, and a releasable connection connecting each adjacent pair of sleeves of the at least two sleeves.

Plate-shaped elements and/or overlays of different thicknesses can be easily fastened with the fastening system according to the invention by virtue of the fact that at least two sleeves having wall openings are arranged in an anchoring direction behind the fastener, wherein the fastener can be guided through the sleeves and is received by the front sleeve in the anchoring direction. The individual sleeves are joined together to form a component by means of the releasable connection depending on the overall length required, wherein all sleeves are aligned with one another.

It suffices for the manufacturer of the fastening system to produce sleeves with wall openings in the standard length, for example in two different standard lengths of 40 mm and 80 mm. On the construction site, the sleeves are simply assembled in standard length(s) according to the overall length required.

One simple option for assembling the sleeves is that the releasable connection is a screw connection. The screw connection has two connection partners, wherein one connection partner is an external thread and one connection partner is an internal thread. At least every further sleeve required to extend the front sleeve in the anchoring direction has, for example, an external thread on one end and an internal thread on an opposite end. The external thread of the further sleeve can be screwed into the internal thread of the sleeve in front of it in the anchoring direction. The sleeves are all provided with wall openings in a manner known per se such that the passage of the adhesive through the assembled sleeve is not impaired along its entire length.

A further, particularly preferred option for simply assembling the sleeves in the desired overall length is that the releasable connection is a rotationally symmetrical snap connection. Snap connections are form-fit connections, wherein a protruding point of one connection partner is briefly deflected during assembly and engages in a recess (undercut) of the other connection partner. Thanks to the simple assembly, the snap connection is a particularly cost-effective connection option. A rotationally symmetrical, cylindrical snap connection is suitable for the sleeves to be connected to one another, whereby an annular bead arranged on one connection partner engages in a corresponding annular recess on the other connection partner. The annular bead and the recess are respectively arranged on a closed end section of the two sleeves. The end section with the bead is located, for example, on a front end in the anchoring direction of the sleeve to be connected. The end section with the circumferential recess is located, for example, on a rear end in the anchoring direction of the sleeve to be connected. The circumferential recess is formed in an inner lateral surface. In principle, the bead and recess can also swap positions.

In order to fix the fastening system to a support without an anchor, the fastener is a fastening screw, which is inserted into the front sleeve in the anchoring direction and is designed to be screwed directly into the support. For a support made of wood, the fastener can, for example, be a wood screw inserted into the front sleeve.

In order to fix the fastening system to a support by an anchor and a screw, the anchor is designed as a separate component from the sleeve in an advantageous embodiment of the invention, but the anchor can be connected to the front sleeve in the anchoring direction in a rotationally fixed manner. The separate production of sleeve and anchor as injection moulded plastic parts is advantageous compared to moulding the anchor onto the front sleeve. In principle, however, the front sleeve can also be designed with moulded-on anchors.

The anchor can have a multi-sided head for the releasable, rotationally fixed connection with the front sleeve in the anchoring direction. The sleeve is formed on the inside with a multi-sided receptacle complementary thereto. This two-part design of anchor and sleeve increases the number of possible applications of the fastening system because different anchors can be combined with the front sleeve in the anchoring direction. The rotationally fixed connection between the sleeve and anchor means that the screw can be easily screwed into the anchor without the anchor rotating in the drilled hole.

Provided that the complementary multi-sided receptacle is not part of the front sleeve in the anchoring direction itself, an adapter with a multi-sided receptacle complementary to the multi-sided head of the anchor can be inserted into the sleeve in one embodiment of the invention. The adapter is in turn secured against rotation with respect to the front sleeve in the anchoring direction. One advantage of the use of an adapter is that identical sleeves can be used for the front sleeve in the anchoring direction and all further sleeves. Additional tool costs for different types of sleeves can hereby be avoided.

In a further embodiment of the invention, identical sleeves with a releasable connection on their front and rear end can be used if a positive locking contour is arranged on a front end in the anchoring direction inside each sleeve, which contour interacts with a complementary positive locking contour of the anchor. In this case, the anchor with an integral positive locking contour is received in a rotationally fixed manner but releasably by the front sleeve in the anchoring direction without the interposition of an adapter.

Particularly preferably, the lateral surface of each sleeve is substantially circularly cylindrical. This creates a fastening system that is not only simple to produce but also provides a uniform connection between the fastening system and the plate-shaped element over its entire length. The sleeve can, however, also have a rectangular, in particular square cross section. Moreover, the cross section can vary over the length of each sleeve; in particular, each sleeve can be conical.

In an advantageous embodiment of the invention, each sleeve has at least two spacers, which are distributed over its circumference and project beyond a lateral surface of the sleeve. Such spacers are known per se from EP 3 421 678 A. The spacers centre each sleeve of the fastening system according to the invention within a pre-drilled hole in the plate-shaped element. The spacers also prevent the sleeves from twisting inside the plate-shaped element when the fastener is anchored in the support as a result of the torque applied in the process.

The spacers are, for example, designed in the form of webs or fins. At least two spacers are preferably arranged both on the front end of each sleeve and on the rear end of each sleeve in the anchoring direction. This ensures that only the spacers, but not the sleeve, come into contact with the perforated wall in the plate-shaped element. Each sleeve is completely surrounded by the curable adhesive.

In principle, all sleeves are designed without retaining plates in order to be able to releasably connect them to one another. The sleeves without retaining plates enable very economical assembly because they can be identical in design. On the other hand, plate anchors require a length that is always adapted to the respective insulation thickness, which means that a variety of components is unavoidable. It is not necessary to close the pre-drilled hole above the sleeves sunk into the insulating boards with a cover plate or roundels. The entire upper hole cavity is filled with the adhesive, which passes radially through the openings and spreads in the insulating material surrounding the sleeve.

In one embodiment of the invention, a retaining plate can be releasably connected to the last of several sleeves. The retaining plate causes the fastening system and plate-shaped element to be flush after the fastening system has been inserted, in particular in mineral wool insulating boards. The releasable connection between the retaining plate and sleeve is preferably also a screw or snap connection. The already existing connection partner of the screw or snap connection on the last sleeve can be used to interact with the complementary connection partner of a screw or snap connection arranged on the retaining plate.

The retaining plate is in particular a spiral retaining plate, which has a cutting edge running spirally around the circumference of a base body, which, when inserted into a plate-shaped element, cuts into the material in a helical manner and thus brings about a flush finish of the fastening system within the plate-shaped element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained below in more detail based on the exemplary embodiments. In the figures:

FIGS. 1*a*-1*d* show a first exemplary embodiment of sleeves of a fastening system according to the invention, in which FIG. 1*a* is a perspective view of a top and a side, FIG. 1*b* is a side view, FIG. 1*c* is a perspective view of a bottom and a side, and FIG. 1*d* is a plan view of the front sleeve in the anchoring direction, FIGS. 2*a*-2*c* show a second embodiment of sleeves of a fastening system according to the invention, in which FIG. 2*a* is a perspective view of the fastening system, FIG. 2*b* is a side view of the fastening system, and FIG. 2*c* is a sectional view through one of the sleeves of the fastening system, FIGS. 3*a*-3*c* show an embodiment of a fastener of the present invention including an anchor and a screw, in which FIG. 3*a* is a perspective view from a bottom and side, FIG. 3*b* is a side view, and FIG. 3*c* is a perspective view from a top and a side, FIGS. 4*a*-4*d* show an adapter for inserting an anchor according to FIG. 3 into a front sleeve in the anchoring direction of a fastening system according to FIG. 2, in which FIG. 4*a* is a perspective view of a top and side, FIG. 4*b* is a side view, FIG. 4*c* is a plan view, and FIG. 4*d* is a bottom view, FIGS. 5*a*-5*c* show a third exemplary embodiment of sleeves of a fastening system according to the invention connected to one another, in which FIG. 5*a* is a perspective view from a top and side, FIG. 5*b* is a side view, and FIG. 5*c* is a perspective view from a top and a side opposite the side of FIG. 5*a*.

FIGS. 9*a* and 9*b* show a sleeve of a fastening system according to the invention, wherein a spiral retaining plate with a cutting edge is attached to the sleeve, in which FIG. 9*a* shows retaining plate with a screw connection for the sleeves of FIGS. 1*a*-1*d* and 2*a*-2*c*, and FIG. 9*b* shows a retaining plate with a snap connection for the sleeves of FIGS. 5*a*-5*c*.

DETAILED DESCRIPTION OF THE PREFERRED EMBODIMENTS

Figure 6:
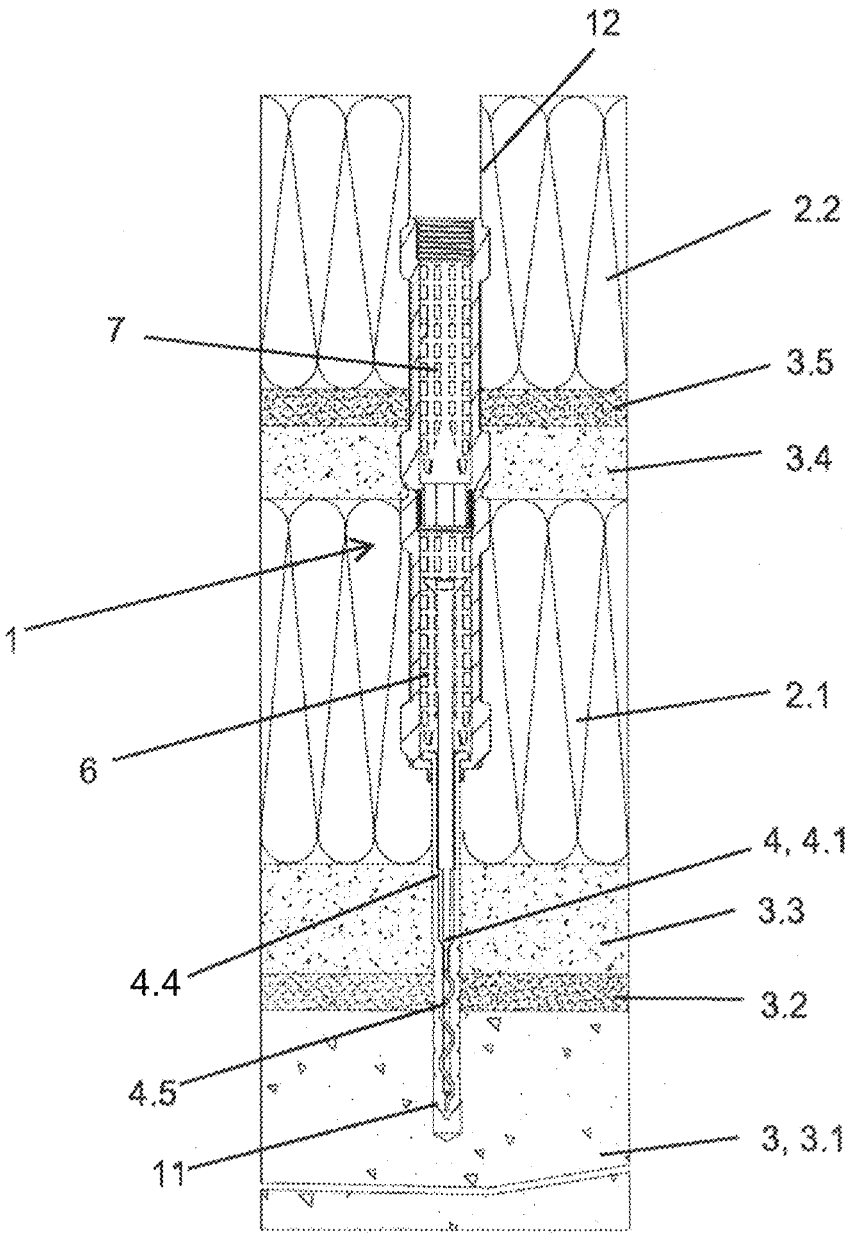
FIG. 6 shows a fastening system according to FIG. 1*a* inserted into a double layer of a thermal insulation composite system in a pre-assembly stage.
Figure 7:
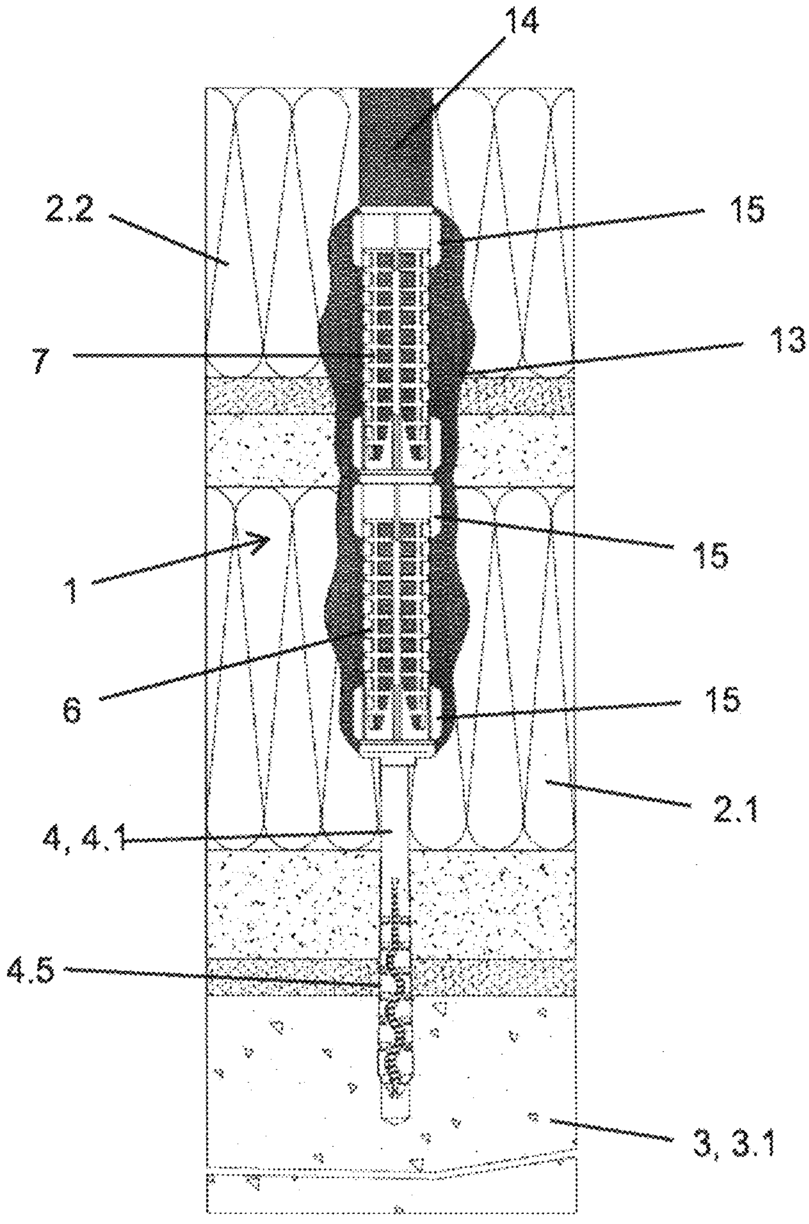
FIG. 7 shows the fully assembled fastening system according to FIG. 6.
Figure 8:
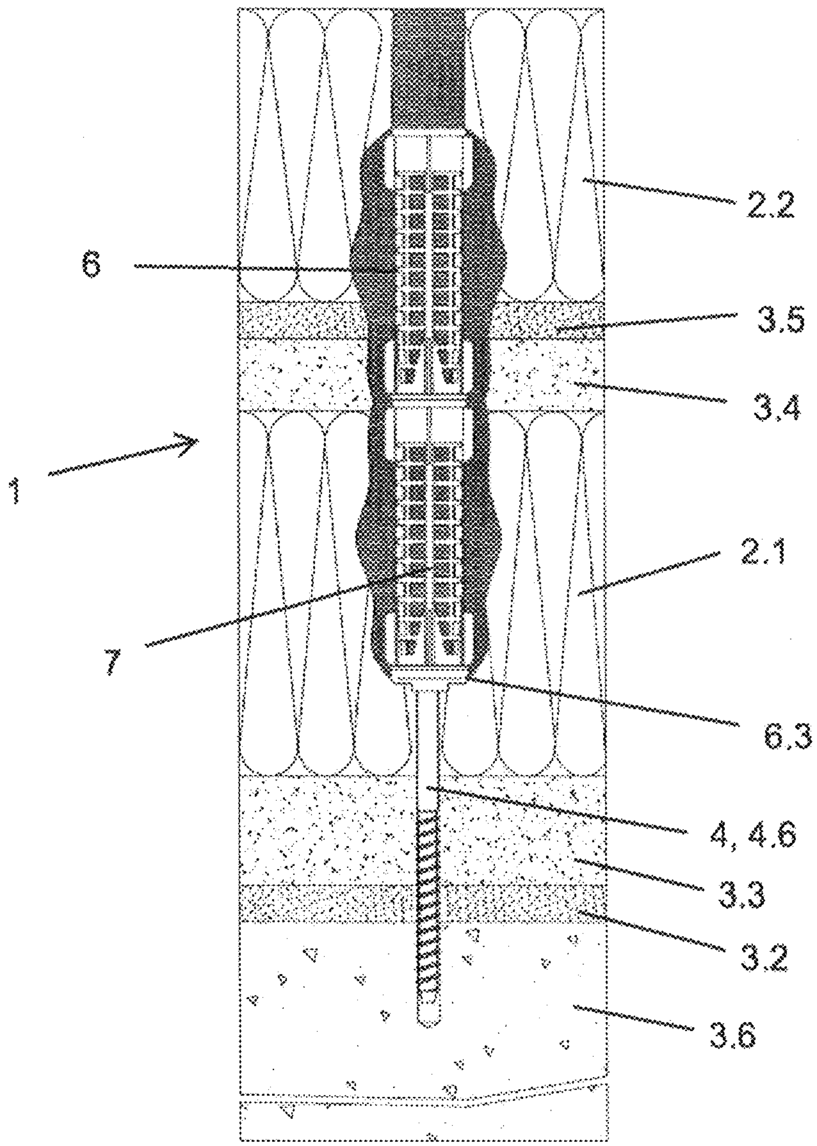
FIG. 8 shows a fastening system according to FIG. 1*a* inserted into a double layer of a thermal insulation composite system, with a different fastener.

FIGS. 1*a*-1*d* show a first exemplary embodiment of a fastening system (1) according to the invention for mounting plate-shaped elements (2) on a surface of a support (3) (the plate shaped elements (2) and the support (3) are shown in FIGS. 6-8).

The fastening system (1) comprises as substantial components a fastener (4) as well as a front sleeve (6) arranged in the anchoring direction (5) directly behind the fastener (4) and having wall openings (8) as well as at least one further rear sleeve (7) arranged in the anchoring direction behind the sleeve (6). The two sleeves (6), (7) are connected to one another via a releasable connection (9).

The anchoring direction (5) runs substantially perpendicular to and in the direction of the surface of the support (3) of the support to which plate-shaped elements (2) are to be fastened with the aid of the fastening system (1) according to the invention. Hereinafter, with reference to the anchoring direction (5), the end of each sleeve (6, 7) leading in the anchoring direction is referred to as the front end (6.1, 7.1) and the opposite end of each sleeve (6, 7) is referred to as the rear end (6.2, 7.2). The front sleeve (6) in the anchoring direction (5) is also hereinafter referred to as the base sleeve (6).

The releasable connection (9) is a screw connection in the exemplary embodiment shown, wherein one connection partner at the front end (7.1) of the rear sleeve (7) is an external thread (9.1) and one connection partner at the rear end (6.2) of the front sleeve (6) is an internal thread (9.2). The rear sleeve (7) serving as an extension has an internal thread (9.2) on its rear end (7.2) designed to receive the external thread (9.1) of a further sleeve (7) as an extension of the fastening system (1), if necessary. The external or internal threads (9.1, 9.2) are inserted at the ends in closed sections of the sleeves (6, 7), which have no wall openings (8).

Figures 1A, 1B, 1C, 1D:
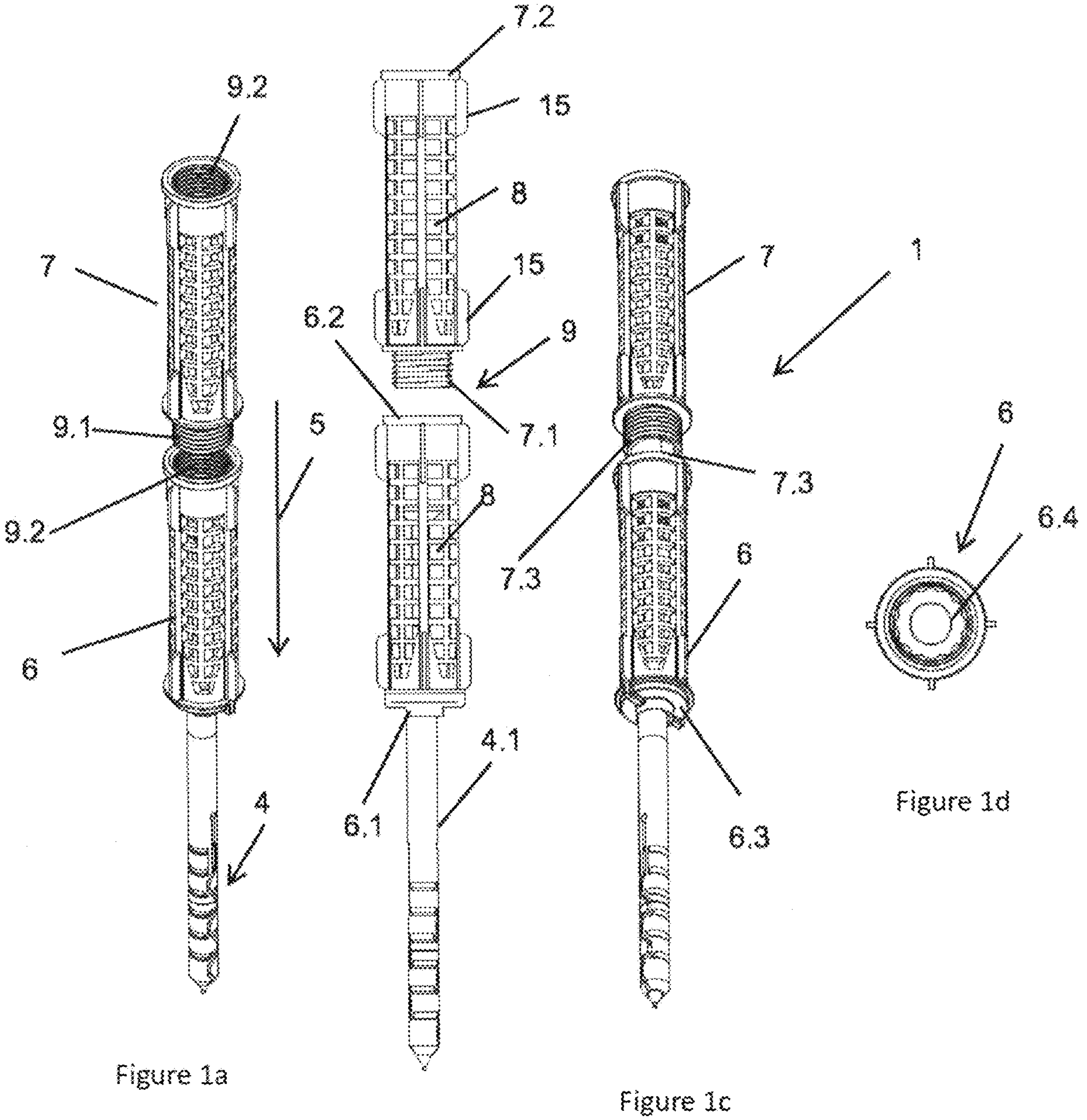

FIG. 1*c* shows that the closed section of the rear sleeve (7) having the external thread (9.1) has a non-circular internal cross section with two flattened areas (7.3) opposite each other at a parallel distance. The technical significance of the flattened areas (7.3) will be explained in more detail below based on FIGS. 4*a*-4*d*.

Referring now also to FIGS. 3*a*-3*c*, the exemplary embodiment shown, the front sleeve (6), i.e. the base sleeve (6), is designed differently from the rear sleeve (7); on its front end (6.1), it has an end cap (6.3) with a central passage, through which an anchor shank (4.2) of an anchor (4.1) can be guided. In order to hold the anchor (4.1) in the base sleeve (6) in a rotationally fixed manner, the former has a multi-sided head (4.3), which is accommodated in a form-fitting manner by a complementary multi-sided receptacle (6.4), which surrounds the passage in the end cap (6.3). The multi-sided receptacle (6.4) in the end cap (6.3) is shown in the plan view of the base sleeve (6) in FIG. 1*d*. The anchor (4.1) is preferably inserted into the sleeve (6) with a screw (4.4) already partially screwed into the anchor shank (4.2).

Instead of a fastener (4) comprising an anchor (4.1) and a screw (4.4), a fastening screw (4.6) can be inserted into the sleeve (6), the shank of which extends through the opening in the end cap (6.3) and the head of which is supported by the edge region of the end cap surrounding the passage. The screw head of the fastening screw (4.6) is accessible through the inside of the interconnected sleeves (6, 7) such that the fastening screw (4.6) can be screwed into the support (3), for example a wooden structure (3.6), without an anchor (FIG. 8).

Figures 2A, 2B, 2C:
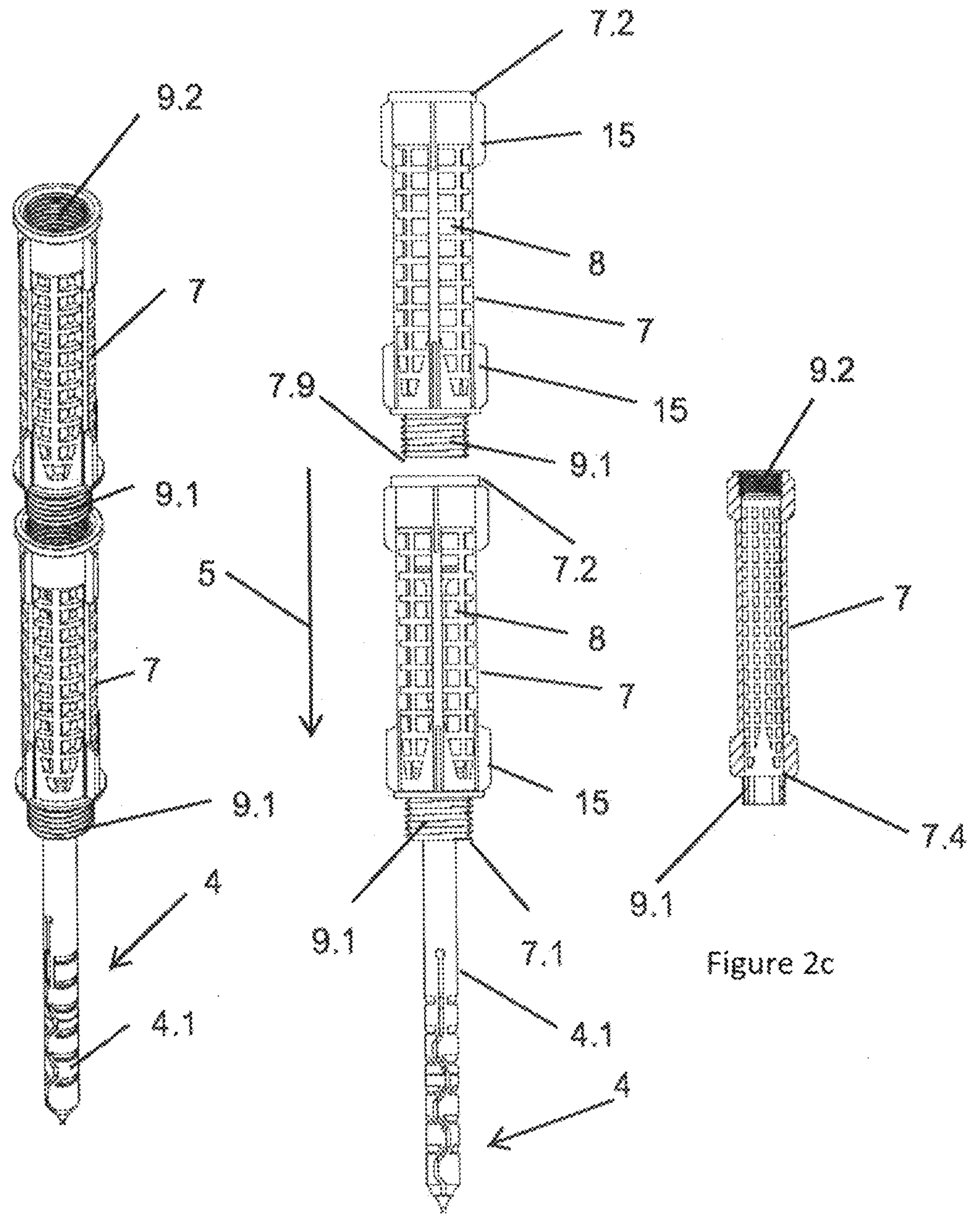
Figure 4A:
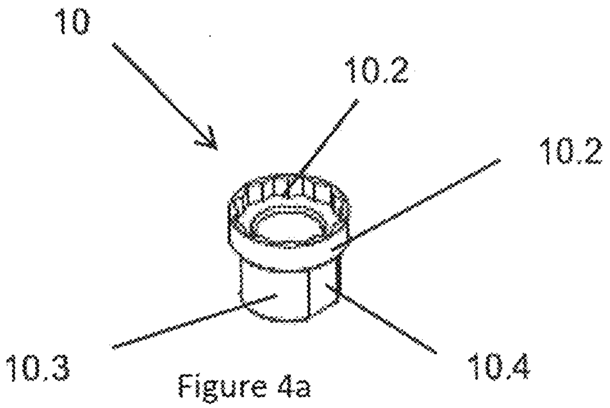
Figure 4B:
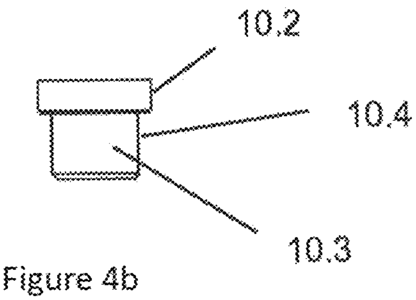
Figure 4C:
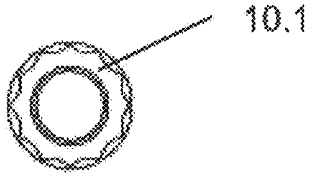
Figure 4D:
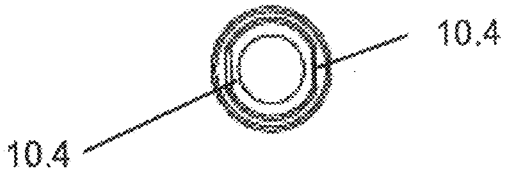

FIGS. 2*a*-2*c* shows a second exemplary embodiment of the fastening system (1) according to the invention, which differs from the exemplary embodiment according to FIGS. 1*a*-1*d* in that the front sleeve (7) in the anchoring direction (5) and the further sleeve (7) releasably connected thereto for extension are identical. Both sleeves (7) respectively have an external thread (9.1) on their front end (7.1) and an internal thread (9.2) on their rear end (7.2). It can be seen that the external thread (9.1) on the front end (7.1) of the base sleeve is not required for the function of the fastening system (1). Nevertheless, this embodiment has the advantage that the fastening system (1) can be exclusively assembled from identical sleeves (7). As a result, the manufacturing costs can be reduced by standardizing the sleeves (7). Moreover, the logistics at the construction site are simplified as only sleeves (7) in standard lengths have to be kept available, which are joined together by means of the releasable connection (9) according to the thickness and/or number of layers of the plate-shaped elements (2).

In order to be able to receive the anchor (4.1) with the multi-sided head (4.3) in the front sleeve (7) in the anchoring direction (5), an adapter (10) shown in FIGS. 4*a*-4*d* is inserted into the base sleeve. The adapter (10) has a multi-sided receptacle (10.1) complementary to the multi-sided head (4.3) of the anchor (4.1) on a hollow and cylindrical rear section (10.2) with respect to the anchoring direction (5). The rear section (10.2) is adjoined by a non-circular front section (10.3) in relation to the anchoring direction (5), which has two opposing flattened areas (10.4). The distance of the flattened areas (10.4) corresponds to the distance of the flattened areas (7.3) at the front end of the sleeve (7), as shown in FIG. 1*c*. The adapter (10) is therefore held in a rotationally fixed manner on the front end (7.1) of the sleeve (7) by the interacting flattened areas (7.3, 10.4) of the sleeve (7) and adapter (10), wherein the rear, hollow-cylindrical section (10.2) rests on an abutment shoulder (7.4) of the sleeve (7) (FIG. 2*c*).

Figures 5A, 5B, 5C:
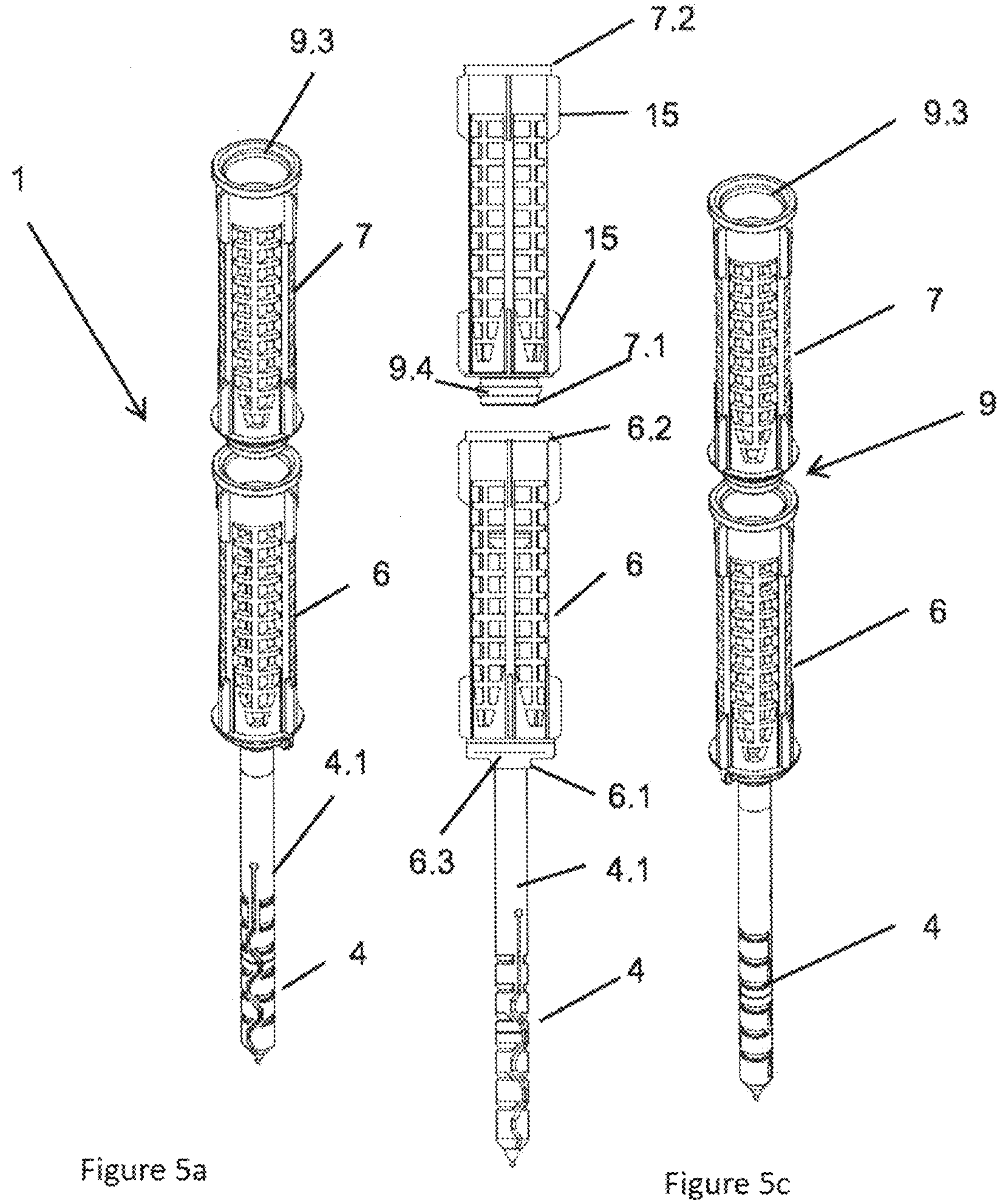

FIGS. 5*a*-5*c* shows a third exemplary embodiment of a fastening system (1) according to the invention, with is equivalent in design to the fastening system (1) according to FIGS. 1*a*-1*d*. There are differences in terms of the releasable connection (9) between the base sleeve (6) and every further sleeve (7) for extending the fastening system (1). The releasable connection (9) is a snap connection in the exemplary embodiment, wherein the connection partner arranged on the rear end (6.2, 7.2) of the sleeves (6, 7) is a circumferential, annular recess (9.3) and the connection partner arranged on the front end (7.1) of the further sleeve (7) is a circumferential bead (9.4), which releasably engages with the corresponding recess (9.3) on the rear end (6.2) of the base sleeve (6).

In terms of receiving the anchor (4.1) in the multi-sided receptacle (6.4) of the end cap (6.3), reference is made in full to the explanations of the exemplary embodiment according to FIGS. 1*a*-1*d*.

FIG. 6 shows the application of the fastening system (1) according to the invention in an exemplary embodiment according to FIGS. 1*a*-1*d* for fastening an overlay on an existing thermal insulation composite system. A first layer of insulating boards (2.1) is fixed to the surface of the support (3), in this case masonry (3.1) with a plaster layer (3.2) and an adhesive layer (3.3). The first layer of insulating boards (2.1) has an outwardly facing plaster layer (3.4), on which a further thermal insulation composite system is to be applied. For this purpose, further insulating boards (2.2) are stuck onto the old plaster layer (3.4) in a second layer, the so-called overlay, by means of an adhesive layer (3.5). In a next step, a drilled hole (11) corresponding to the diameter of the anchor (4.1) is pre-drilled through the two layers of insulating boards (2.1, 2.2) into the masonry (3.1). A through-hole (12) larger than the drilled hole (11) is subsequently made in the two layers of insulating boards (2.1, 2.2) as well as the plaster and adhesive layer (3.4, 3.5) in between. The pre-assembled fastening system (1) comprising the two sleeves (6, 7) connected to one another is then inserted into the through-hole (12) together with the anchor (4.1) and the partially screwed-in screw (4.4) until the anchor (4.1) is completely inserted into the drilled hole (11) in the masonry (3.1) and the front end (6.1) of the base sleeve (6) rests on the bottom of the drilled hole of the through-hole (12). In principle, the screw (4.4) of the anchor can also be inserted after the pre-assembled fastening system (1) has been positioned.

The anchor (4.1) is then anchored in the area of its expansion zone (4.5) by the screw (4.4) screwed in by means of a screw-in tool in the drilled hole (11) in the masonry (3.1). Adhesive is then introduced via the through-hole (12) and thus the interconnected sleeves (6, 7) and spreads through the wall openings (8) arranged uniformly around the circumference and over the length of the two sleeves (6, 7) in the insulating material, wherein the sleeves (6, 7) are surrounded by the adhesive (13), as shown in FIG. 7 by the extended boundary lines of the adhesive filling. First, the entire cavity of the two sleeves (6, 7) and their surroundings and then the free space (14) of the through-hole (12) remaining above the sleeves (6, 7) is filled by the adhesive (13). Once the adhesive (13) has hardened, the overlaid insulating board (2.2) is fixedly connected to the two sleeves (6, 7) and the metallic head of the screw (4.4) is completely shielded from the outside by the adhesive (13).

In the exemplary embodiment shown, all sleeves (6, 7) respectively have four spacers (15) distributed around their circumference, both on the front ends (6.1, 7.1) and the rear ends (6.2, 7.2) in order to improve the distribution of the adhesive (13) in the cross section of the through-hole (12) that is larger than the diameter of the sleeves (6, 7).

Finally, FIG. 8 shows a fully assembled fastening system (1) according to FIG. 7, wherein the support (3) on which the first layer of insulating boards (2.1) is mounted is not masonry (3.1) but rather a wooden structure (3.6), in which the aforementioned fastening screw (4.6), in this case a wood screw, directly engages, the head of which is rotatably held in the end cap (6.3) of the base sleeve (6).

Figure 9A:
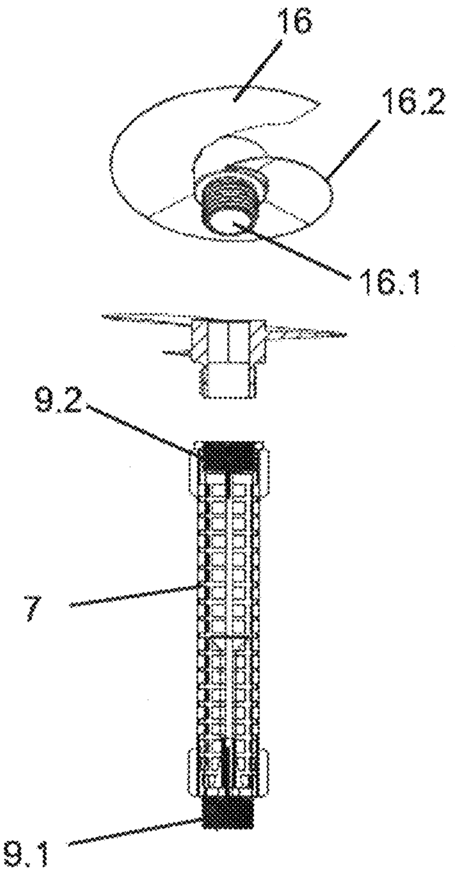
Figure 9B:
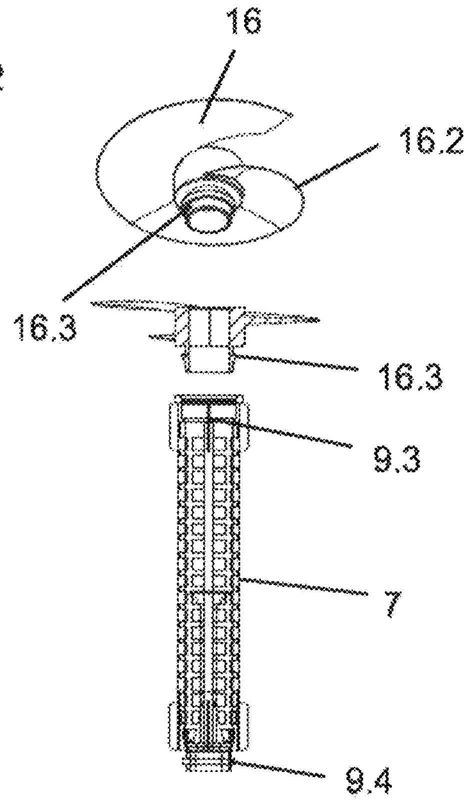

In principle, none of the sleeves (6,7) of the fastening system (1) have a retaining plate. Depending on the material of the plate-shaped element (2) to be fastened, it can, however, be desirable that the last sleeve in the anchoring direction (5) has a spiral retaining plate (16) with a cutting edge (16.2) as shown in FIGS. 9*a* and 9*b*. In order not to impair the modularity of the further sleeves (7), the spiral retaining plate (16) in FIG. 9*a* is screwed with an external thread (16.1) into the internal thread (9.2) of the respectively last sleeve (7) of the fastening system (1). The cutting edge (16.2) of the spiral retaining plate (16) cuts into the plate-shaped element (not shown) during rotary insertion and brings about a flush finish of the fastening system (1). The retaining plate (16) of FIG. 9*b* is designed for the last sleeve (7) of FIGS. 5*a*-5*c* and includes a circumferential bead (16.3) that is inserted into the annular recess (9.3) of the last sleeve (7).

Thus, while there has been shown and described and pointed out the fundamental novel features of the invention is applied to a preferred embodiment thereof, it will be understood that various omissions and substitutions and changes in the form and details of the devices illustrated, and in their operation, may be made by those skilled in the art without departing from the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

| No. | Term |
|---|---|
| 1. | Fastening system |
| 2. | Plate-shaped element |
| 2.1 | Insulating board |
| 2.2 | Further insulating board |
| 3. | Support |
| 3.1 | Masonry |
| 3.2 | Plaster layer |
| 3.3 | Adhesive layer |
| 3.4 | Plaster layer |
| 3.5 | Adhesive layer |
| 3.6 | Wooden construction |
| 4. | Fastener |
| 4.1 | Anchor |
| 4.2 | Anchor shank |
| 4.3 | Multi-sided head |
| 4.4 | Screw |
| 4.5 | Expansion zone |
| 4.6 | Fastening screw |
| 5. | Anchoring direction |
| 6. | Sleeve/base sleeve |
| 6.1 | Front end |
| 6.2 | Rear end |
| 6.3 | End cap |
| 6.4 | Multi-sided receptacle |
| 7. | Further sleeve |
| 7.1 | Front end |
| 7.2 | Rear end |
| 7.3 | Flattened areas |
| 7.4 | Bearing shoulder |
| 8. | Wall opening |
| 9. | Releasable connection |
| 9.1 | External thread |
| 9.2 | Internal thread |
| 9.3 | Recess |
| 9.4 | Bead |
| 10. | Adapter |
| 10.1 | Multi-sided receptacle |
| 10.2 | Rear section |
| 10.3 | Front section |
| 10.4 | Flattened areas |
| 11. | Drilled hole |
| 12. | Through-hole |
| 13. | Adhesive |
| 14 | Free space |
| 15. | Spacer |
| 16. | Spiral retaining plate |
| 16.1 | External thread |
| 16.2 | Cutting edge |
| 16.3 | Bead |

The invention claimed is:

1. A fastening system for mounting plate-shaped elements on a surface of a support, comprising:

a fastener configured to anchor the fastening system in the support, at least two sleeves arranged behind the fastener in an anchoring direction, each of the at least two sleeves having wall openings, wherein the fastener is configured to be guided through the at least two sleeves and a front sleeve of the at least two sleeves in the anchoring direction receives the fastener, a releasable connection connecting each adjacent pair of sleeves of the at least two sleeves.

2. The fastening system according to claim 1, wherein the releasable connection is a screw connection.

3. The fastening system according to claim 2, the screw connection has two connection partners, wherein one connection partner is an external thread and one connection partner is an internal thread.

4. The fastening system according to claim 1, wherein the releasable connection is a cylindrical snap connection.

5. The fastening system according to claim 4, wherein the cylindrical snap connection has two connection partners, wherein one connection partner is a bead and one connection partner is a recess.

6. The fastening system according to claim 1, wherein the fastener is a fastening screw, which is inserted into the front sleeve in the anchoring direction and is configured to be screwed directly into the support.

7. The fastening system according to claim 1, wherein the fastener comprises an anchor and a screw, wherein the anchor is connectable to the front sleeve in the anchoring direction in a rotationally fixed manner.

8. The fastening system according to claim 7, wherein the anchor has a multi-sided head and the front sleeve is formed on the inside with a multi-sided receptacle complementary thereto.

9. The fastening system according to claim 7, wherein the anchor has a multi-sided head, and an adapter with a multi-sided receptacle complementary to the multi-sided head inserted secured against rotation into the front sleeve in the anchoring direction.

10. The fastening system according to claim 9, wherein the at least two sleeves are identical.

11. The fastening system according to claim 1, wherein each sleeve of the at least two sleeves has a base body with a circular cross section.

12. The fastening system according to claim 1, wherein each sleeve of the at least two sleeves has at least two spacers, which are distributed over its circumference and project radially beyond a lateral surface of each sleeve.

13. The fastening system according to claim 1, further comprising a spiral retaining plate with a cutting edge releasably arranged on a rear sleeve of the at least two sleeves in the anchoring direction.

14. The fastening system according to claim 1, wherein the wall openings in the sleeves are configured for an adhesive to pass through.

15. The fastening system according to claim 1, wherein each of the at least two sleeves has a front end and a rear end, and the releasable connection connects the front end of a first sleeve of each adjacent pair of sleeves to the rear end of a second sleeve of each adjacent pair of sleeves.

* * * * *